Nov. 19, 1968   J. S. JARVIS   3,411,274
COMBINE HARVESTERS
Filed June 20, 1966   3 Sheets-Sheet 1
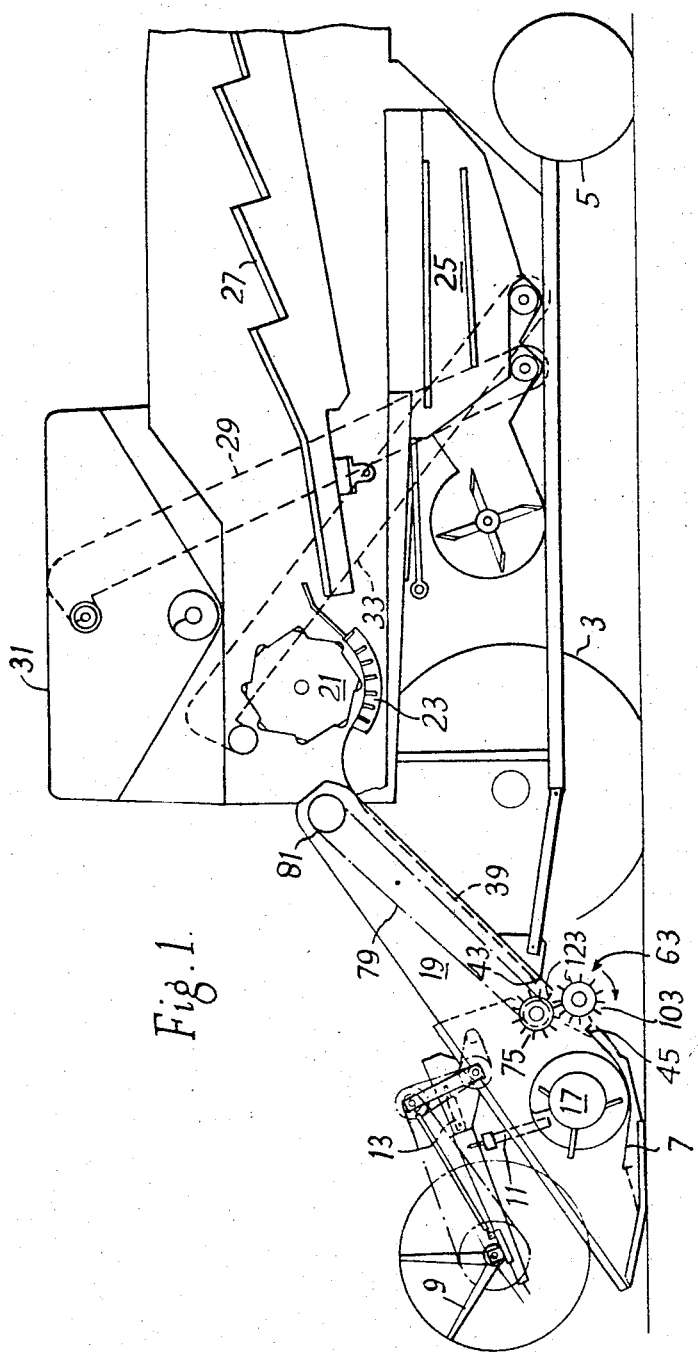

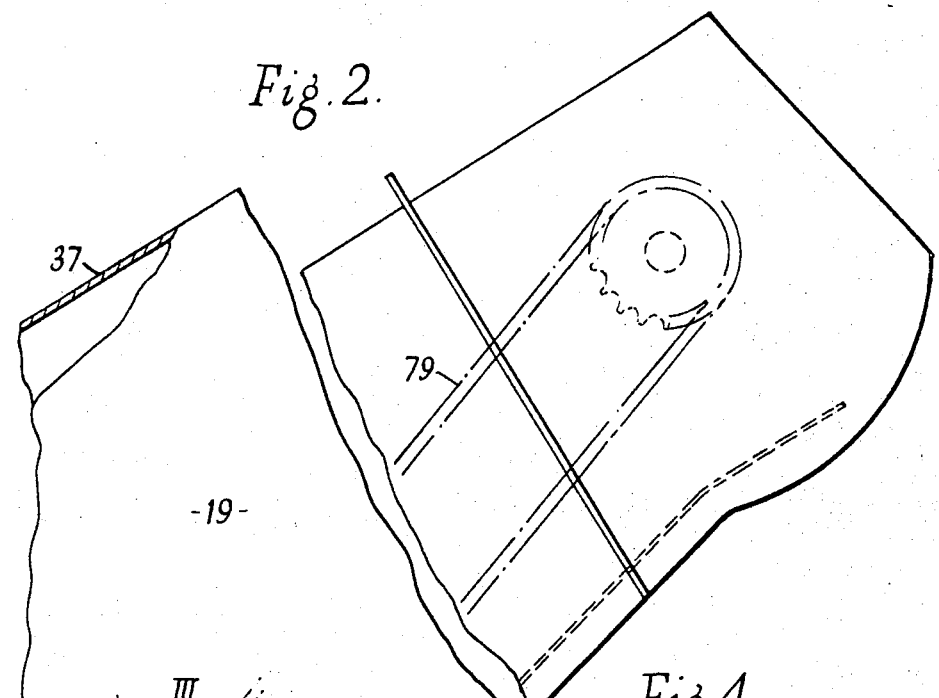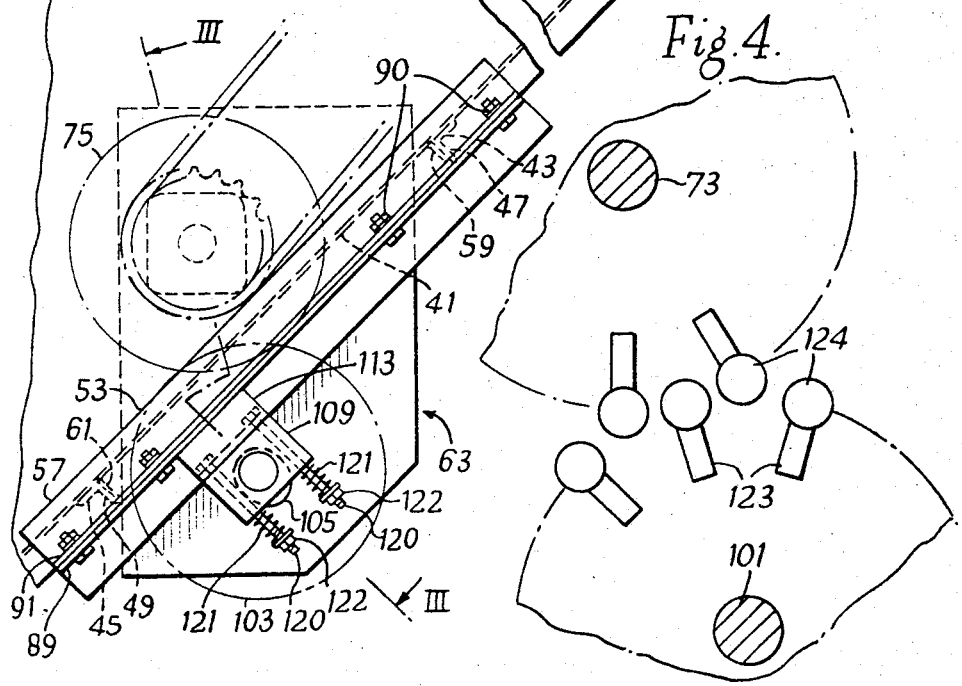

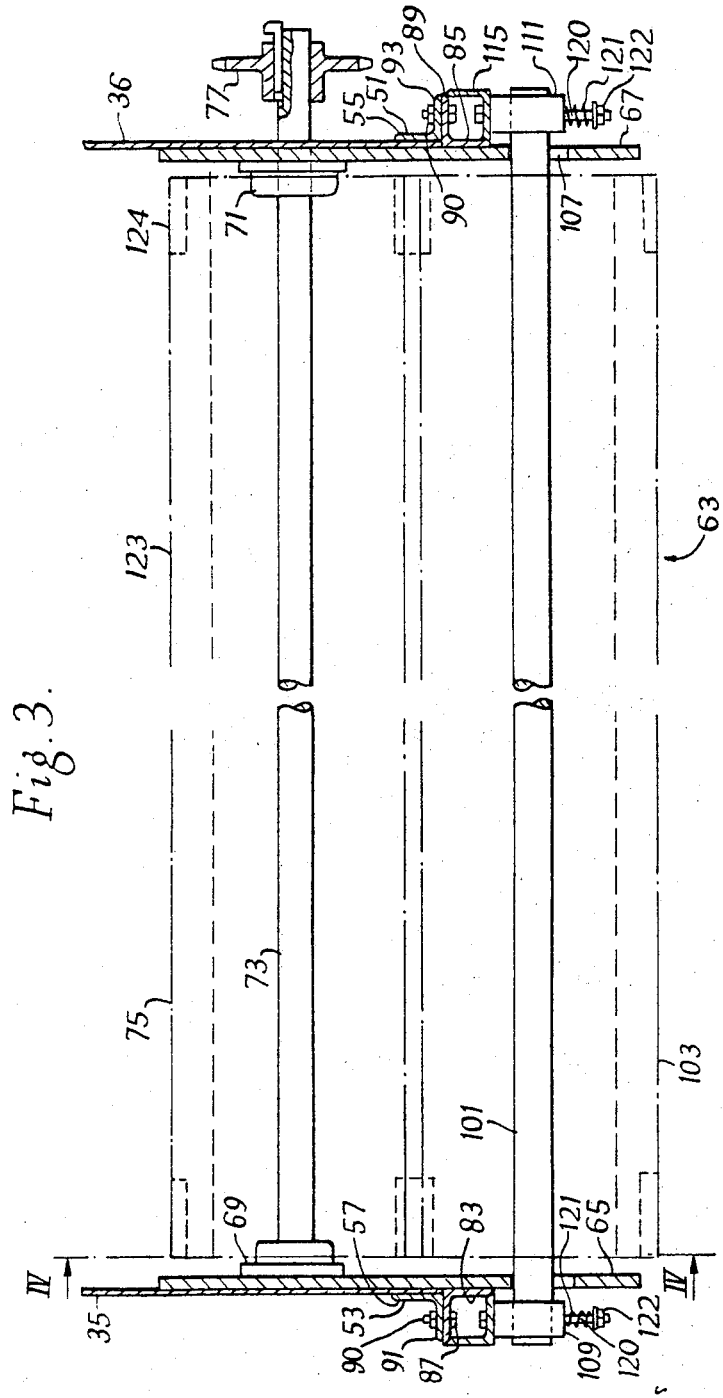

United States Patent Office 3,411,274
Patented Nov. 19, 1968

3,411,274
COMBINE HARVESTERS
John Stevens Jarvis, Ipswich, England, assignor to
Ransomes Sims & Jefferies Ltd.
Filed June 20, 1966, Ser. No. 558,999
Claims priority, application Great Britain, June 25, 1965,
27,119/65
5 Claims. (Cl. 56—21)

This invention relates to combine harvesters and has for its object the provision of a combine harvester of greater versatility than has hitherto been afforded in the sense that the harvester can be adapted for use as a hay harvesting machine for material such as alfalfa or grass.

According to the present invention a combine harvester has a feed table including a crop cutting mechanism, feed auger means rearwardly of the cutting mechanism, upwardly and rearwardly inclined elevator means rearwardly of the feed auger means to a lower end of which crop cut by the cutting mechanism is fed by the feed auger means, crop threshing mechanism adjacent to the upper end of the elevator means and grain separating and cleaning means rearwardly of the crop threshing mechanism, wherein the casing of the elevator means is formed in a floor portion and towards the lower end thereof with an opening having a removable cover and is adapted, adjacent the removable cover and when the latter is removed, to support co-operating bruising or crimping rollers, whereby, during operation of the combine harvester as a hay harvester, cut material is fed by the feed auger means to the crimping rollers from which it is discharged to the ground through the opening in the floor portion of the elevator means.

Advantageously, the crimping rollers are formed as a unit to enable them readily to be mounted on brackets provided on the casing of the elevator means. The unit may comprise two or more co-operating crimping rollers.

Suitably, the crimping rollers are provided with adjustable means for adjusting the pressure acting on cut material passing between the rollers. Preferably, the crimping rollers are formed with meshing, axially extending flutes.

The invention will now be described by way of example with reference to the accompanying drawings, in which:

FIGURE 1 is a somewhat diagrammatic side elevation of a combine harvester according to the invention, FIGURE 2 is a fragmentary view to an enlarged scale illustrating details of the invention, FIGURE 3 is a view on the line III—III of FIGURE 2, and FIGURE 4 is a scrap view on the line IV—IV of FIGURE 3.

Referring to the drawings a combine harvester machine is supported on ground engaging pairs of front wheels 3 and rear wheels 5 and includes at its forward end a feed table 7 end, for feeding crop towards the feed table a reel 9, the height and the fore and aft position of which relative to the feed table is adjustable by hydraulic rams 11 and 13.

On the feed table is a cutter mechanism (not shown) to the rear of which is a feed auger 17 by the agency of which cut material is fed inwardly to the lower end of an upwardly and rearwardly inclined elevator 19. The elevator supplies the crop to a drum 21 and concave 23 where the main threshing action takes place and grain passing through the concave is conveyed for cleaning purposes to the dressing shoe 25, whilst straw discharged at the rear of the drum passes to grain separating mechanism comprising so-called "straw walkers" 27 which effect separation from the straw of residual grain. The straw is finally discharged at the rear of the machine whilst a grain elevator 29 conveys grain from the dressing shoe 25 to a grain tank 31 and a tailings elevator 33 conveys upseparated grain and small pieces of straw from the dressing shoe to the inlet side of the drum and concave.

The elevator 19 comprises an upwardly and rearwardly extending casing or trunking which is of rectangular cross section having parallel upright side walls 35 and 36 and transverse roof and floor portions 37 and 39. Within the trunking is disposed an endless belt type ladder conveyor (not shown) of known form between which and the floor portion 39 of the trunking, material is fed upwardly and rearwardly through the elevator to the drum and concave.

The floor portion 39 of the elevator trunking adjacent the lower end thereof is formed with an opening, which is fitted with a removable cover 41. The opening in the floor portion is defined by transversely disposed spaced angle brackets 43 and 45 secured to the underside of the floor portion 39 which have respective depending flanges 47 and 49 and by angle brackets 51 and 53 upright flanges 55 and 57 of which are secured to lower upwardly and rearwardly inclined edges of the elevator side walls 36 and 35. The brackets 43, 45, 51 and 53 thus form a frame within which, when the machine is used as a combine harvester, fits the cover 41, the latter being formed at its edges with depending flanges of which, when the cover is in position, flanges 59 and 61 are secured by bolts to angle bracket flanges 47 and 49.

To adjust the combine harvester for use as a hay harvester, the removable cover 41 in the floor portion of the elevator trunking is removed as also is the ladder conveyor within the trunking. A bruising or crimping roller unit generally indicated by reference numeral 63 is then mounted in the aperture in the floor portion of the elevator trunking. The crimping unit comprises side plates 65 and 67 on which are supported bearings 69 and 71 in which is carried the shaft 73 of an upper crimping roller 75. One end of the shaft 73 projects outwards beyond the side wall 36 of the trunking and carries on its outer end a driven sprocket 77 keyed to the shaft 73 and connected by an endless chain 79 to a drive sprocket 81 mounted on the upper drive shaft of the elevator conveyor. The side plates 65 and 67 have secured thereto upwardly and rearwardly inclined angle brackets 83 and 85 having outwardly projecting flanges 87 and 89 by means of which the crimping roller unit is removably secured as by bolts 90 to outwardly projecting flanges 91 and 93 of the angle brackets 53 and 51. The plates 65 and 67 also support a shaft 101 of a lower crimping roller 103, the ends of the shaft 101 passing through slots 105 and 107 in the plates 65 and 67 and engaging in bearings accommodated in housings 109 and 111. The housings 109 and 111 are hung on respective angle brackets 113 and 115, which are welded to the angle brackets 83 and 85, each by a pair of studs 120 which carry coil springs 121, the latter biasing the lower crimping roller 103 into engagement with the upper crimping roller. Nuts 122 carrier on the respective studs 120 can be rotated to adjust the biasing force of the springs 121 on the roller 103. Thus the pressure exerted on material caused to pass between the crimping rollers is rendered adjustable by adjusting the force exerted by the springs 121. When the crimping roller unit is mounted on the side walls of the elevator trunking, the rollers 75 and 103 are horizontally disposed with the path between the rollers arranged slightly above the floor level of the elevator trunking.

The crimping rollers 75 and 103 are each formed with longitudinally extending flutes 123, which are made of rectangular section material. At each end of the flutes on one roller is formed a rounded portion 124, which meshes with a similar rounded portion 124 of flute on the other crimping roller. Suitably, one or both of the crimping rollers between the engaging portions are formed from resilient material such as reinforced rubber.

In operation material, e.g. alfalfa or grass cut by the cutting mechanism is fed inwardly by the feed auger 17 and from the feed auger to the crimping rollers of the unit 63. The cut grass passes between the crimping rollers where bruising thereof takes place and grass discharged from the crimping rollers passes through the aperture in the floor portion 39 of the elevator trunking to the ground. The bruising of the grass which takes place in the passage thereof between the crimping rollers assists in a more rapid drying action. It will be noted that the material passed through the crimping rollers is not accordingly supplied to main threshing mechanisms of the combine harvester.

I claim:

1. A combine harvester having a feed table including a crop cutting mechanism, feed auger means rearward of the cutting mechanism upwardly and rearwardly inclined elevator means rearwardly of the feed auger means to a lower end of which crop cut by the cutting mechanism is fed by the feed auger means, crop threshing mechanism adjacent to the upper end of the elevator means and grain separating and cleaning means rearwardly of the crop threshing mechanism, wherein the casing of the elevator means is formed in a floor portion and towards the lower end thereof with an opening having a removable cover and is adapted, adjacent the removable cover and when the latter is removed, to support co-operating bruising or crimping rollers, whereby, during operation of the combine harvester as a hay harvester, cut material is fed by the feed auger means to the crimping rollers from which it is discharged to the ground through the opening in the floor portion of the elevator means.

2. A combine harvester as claimed in claim 1 wherein the crimping rollers are formed as a unit which includes means for supporting the unit in operative position on the casing of the elevator means.

3. A combine harvester as claimed in claim 2 wherein adjustable biassing means are provided for adjusting the pressure acting on cut material passing between the rollers.

4. A combine harvester as claimed in claim 2, wherein the crimping rollers are formed with meshing, axially extending flutes.

5. A combine harvester as claimed in claim 2, wherein the crimping rollers are formed from resilient material.

References Cited

UNITED STATES PATENTS

| | | | |
|---|---|---|---|
| 2,698,170 | 12/1954 | Foley | 56—1 X |
| 3,282,408 | 11/1966 | Lohrentz | 56—1 X |
| 3,100,370 | 8/1963 | Blanshine | 56—21 |

ABRAHAM G. STONE, *Primary Examiner.*

P. A. RAZZANO, *Assistant Examiner.*